US011756101B2

(12) United States Patent
Joshi et al.

(10) Patent No.: US 11,756,101 B2
(45) Date of Patent: *Sep. 12, 2023

(54) METHODS AND APPARATUSES FOR EVALUATING SUBSTITUTIONS MADE DURING ORDER FULFILLMENT PROCESSES

(71) Applicant: Walmart Apollo, LLC, Bentonville, AR (US)

(72) Inventors: Sushant Pralhad Joshi, Fremont, CA (US); Kamiya Motwani, Madhya Pradesh (IN); Prashant Chandrakant Saundade, San Jose, CA (US); Sushant Kumar, Sunnyvale, CA (US); Vidya Sagar Kalidindi, Milpitas, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,113

(22) Filed: May 16, 2022

(65) Prior Publication Data

US 2022/0277377 A1 Sep. 1, 2022

Related U.S. Application Data

(63) Continuation of application No. 16/752,521, filed on Jan. 24, 2020, now Pat. No. 11,367,119.

(51) Int. Cl.
*G06Q 10/0639* (2023.01)
*G06Q 30/0601* (2023.01)
*G06N 20/00* (2019.01)

(52) U.S. Cl.
CPC ......... *G06Q 30/0631* (2013.01); *G06N 20/00* (2019.01); *G06Q 10/06393* (2013.01); *G06Q 30/0633* (2013.01)

(58) Field of Classification Search
None
See application file for complete search history.

(56) References Cited

U.S. PATENT DOCUMENTS

| 7,035,786 B1 | 4/2006 | Abu El Ata et al. |
| 7,233,914 B1 | 6/2007 | Wijaya et al. |

(Continued)

FOREIGN PATENT DOCUMENTS

| WO | WO-03050735 A2 * | 6/2003 | ............. G06Q 10/06 |
| WO | 2017172753 A1 | 10/2017 | |
| WO | 2018200996 A1 | 11/2018 | |

OTHER PUBLICATIONS

Bacel et al "Joint replenishment model for multiple products with substitution", Dec. 2016, Applied Mathematical Modelling, pp. 7678-7688 (Year: 2016).*

(Continued)

*Primary Examiner* — Romain Jeanty
(74) *Attorney, Agent, or Firm* — Morgan, Lewis & Bockius LLP

(57) ABSTRACT

A system includes a computing device configured to receive order data indicating an order placed by a customer on an e-commerce platform and route the order into a test group or a control group when the order data indicates that the order will be filled by a store participating in the comparison test. The computing device is further configured to apply test features to the order if the order was routed into the test group and apply control features to the order if the order was routed into the control group and determine recommended substitute items based on the test features or the control features. The recommended substitute items are intended to replace items ordered by the customer that are unavailable. The computing device is also configured to determine one or more performance metrics of the test group and the control group.

20 Claims, 9 Drawing Sheets

(56) References Cited

U.S. PATENT DOCUMENTS

| | | | |
|---|---|---|---|
| 7,890,415 B1 | 2/2011 | Keith | |
| 8,090,626 B1 | 1/2012 | Wijaya et al. | |
| 8,577,733 B2 | 11/2013 | Atwater et al. | |
| 8,751,334 B2* | 6/2014 | Wijaya | G06Q 30/0643 705/26.81 |
| 8,768,932 B1 | 7/2014 | Kacholia et al. | |
| 9,202,246 B1* | 12/2015 | Bundy | G06Q 30/0635 |
| 10,127,596 B1 | 11/2018 | Franke et al. | |
| 10,185,984 B2 | 1/2019 | Shaffer et al. | |
| 10,346,895 B2* | 7/2019 | Stoll | G06Q 30/0214 |
| 10,540,632 B2* | 1/2020 | Putcha | G08B 21/18 |
| 10,685,308 B1 | 6/2020 | Avery, Jr. et al. | |
| 11,188,831 B2 | 11/2021 | Snyder et al. | |
| 2007/0073580 A1 | 3/2007 | Perry et al. | |
| 2008/0046269 A1* | 2/2008 | Lopez | G06Q 10/0631 705/305 |
| 2008/0114640 A1* | 5/2008 | Knipfer | G06Q 30/0202 705/7.31 |
| 2008/0288328 A1 | 11/2008 | Minor et al. | |
| 2009/0125411 A1 | 5/2009 | Otto et al. | |
| 2010/0023340 A1 | 1/2010 | Chowdhary et al. | |
| 2010/0114665 A1 | 5/2010 | Stengard et al. | |
| 2010/0262521 A1 | 10/2010 | Robinson et al. | |
| 2014/0089133 A1 | 3/2014 | Argue et al. | |
| 2014/0278627 A1 | 9/2014 | Grabovski et al. | |
| 2016/0063548 A1 | 3/2016 | Simo et al. | |
| 2016/0063604 A1 | 3/2016 | Shaffer et al. | |
| 2016/0225063 A1 | 8/2016 | Wical | |
| 2017/0140403 A1 | 5/2017 | Fujita et al. | |
| 2017/0337523 A1 | 11/2017 | Roach et al. | |
| 2019/0213509 A1* | 7/2019 | Burleson | G06N 20/00 |
| 2019/0378081 A1 | 12/2019 | Swartz et al. | |
| 2021/0019805 A1 | 1/2021 | Kumar et al. | |

OTHER PUBLICATIONS

Zhijie et al "The Demand Effects of Product Recommendation Networks: An Empirical Analysis of Network Diversity and Stability", Jun. 2017, MIS Quarterly vol. 41 No. 2, pp. 397-426 (Year: 2017).*

Qin, "Introduction to E-commerce," Tsinghua University Press, Springer, 2009, pp. 1-527.

Evy "Planners urged to focus on client education", Aug. 2011, Money Management, 1 page (Year: 2011).

Murat Koyuncu, "An Alternative Product Extraction Method for E-Commerce Applications," Sep. 2007, 18th International Workshop on Database and Expert Systems Applications, IEEE Computer Society, pp. 397-401.

* cited by examiner

METHODS AND APPARATUSES FOR EVALUATING SUBSTITUTIONS MADE DURING ORDER FULFILLMENT PROCESSES

CROSS-REFERENCE TO RELATED APPLICATIONS

This application is a continuation of, and claims priority to, U.S. application Ser. No. 16/752,521, filed on Jan. 24, 2020 and entitled "METHODS AND APPARATUSES FOR EVALUATING SUBSTITUTIONS MADE DURING ORDER FULFILLMENT PROCESSES," (now U.S. Pat. No. 11,367,119), which is hereby incorporated by reference in its entirety.

TECHNICAL FIELD

The disclosure relates to methods and apparatuses for evaluating substitutions made to ordered items during an order fulfillment process. More particularly, the disclosure relates to methods and apparatuses for automatically evaluating processes used to replace items ordered by a customer on an e-commerce platform during an order fulfillment process.

BACKGROUND

At least some e-commerce platforms, such as retailer websites, mobile applications or other e-commerce environments, allow customers to place orders via the e-commerce platform that are subsequently fulfilled using various processes. During such order fulfillment processes, a product or service that is ordered by the customer may not be available. The availability of a product or service can be effected for example by stock shortages, increased demand, inventory losses, manufacturing issues or delivery delays. When a product or service is unavailable after a customer has placed an order, a substitute product or service can be recommended to be included with the order instead of the product or service that is unavailable.

Order fulfillment processes can result in decreases sales, and/or reduced customer satisfaction if the substitute product or service is an undesirable substitute to the customer. Conversely, order fulfillment processes can result in increased sales and improved customer satisfaction when the substitute product or service is a suitable replacement for an unavailable product or service. There is a need, therefore, for improved order fulfillment and/or order substitution processes that result in substituted items being accepted by the customer. In addition, it can be desirable to evaluate the performance of order fulfillment processes and/or substitution processes in order to determine whether new or modified order fulfillment processes (or elements thereof) are improvements over existing or alternative order fulfillment processes.

SUMMARY

The embodiments described herein are directed to automatically routing orders into a test group and a control group for the comparison of two operating conditions of an order fulfillment process or for comparison of two different order fulfillment processes. The apparatuses and methods of the present disclosure can allow a user to define a comparison test to include one or more test features that can be different from one or more control features for an order fulfillment process. Such order fulfillment processes can be processes in which orders are received from customers on an e-commerce platform and then filled at physical store locations to be picked up by the customer. The apparatuses and methods of the present disclosure allow reliable, unbiased comparison tests to be performed in such order fulfillment processes that include multiple individual participants (e.g., customers and store associates) as well as multiple physical store locations with multiple management and information technology systems.

In accordance with various embodiments, exemplary systems may be implemented in any suitable hardware or hardware and software, such as in any suitable computing device. For example, in some embodiments, a computing device is configured to receive order data indicating an order placed by a customer on an e-commerce platform and route the order into a test group or a control group when the order data indicates that the order will be filled by a store participating in a comparison test. The computing device can also apply test features to the order if the order was routed into the test group and apply control features to the order if the order was routed into the control group. The computing device can further determine recommended substitute items based on the test features or the control features wherein the recommended substitute items are intended to replace items ordered by the customer that are unavailable. The computing device can also determine one or more performance metrics of the test group and the control group.

In some embodiments, a method is provided that includes receiving order data indicating an order placed by a customer on an e-commerce platform and routing the order into a test group or a control group when the order data indicates that the order will be filled by a store participating in a comparison test. The method can also include applying test features to the order if the order was routed into the test group and apply control features to the order if the order was routed into the control group and determining recommended substitute items based on the test features or the control features wherein the recommended substitute items are intended to replace items ordered by the customer that are unavailable. The method can also include determining one or more performance metrics of the test group and the control group.

In yet other embodiments, a non-transitory computer readable medium has instructions stored thereon, where the instructions, when executed by at least one processor, cause a computing device to perform operations that may include receiving order data indicating an order placed by a customer on an e-commerce platform and routing the order into a test group or a control group when the order data indicates that the order will be filled by a store participating in a comparison test. The operations may also include applying test features to the order if the order was routed into the test group and apply control features to the order if the order was routed into the control group and determining recommended substitute items based on the test features or the control features wherein the recommended substitute items are intended to replace items ordered by the customer that are unavailable. The operations may further include determining one or more performance metrics of the test group and the control group.

BRIEF DESCRIPTION OF THE DRAWINGS

The features and advantages of the present disclosures will be more fully disclosed in, or rendered obvious by the following detailed descriptions of example embodiments.

The detailed descriptions of the example embodiments are to be considered together with the accompanying drawings wherein like numbers refer to like parts and further wherein.

DETAILED DESCRIPTION

Figure 1:
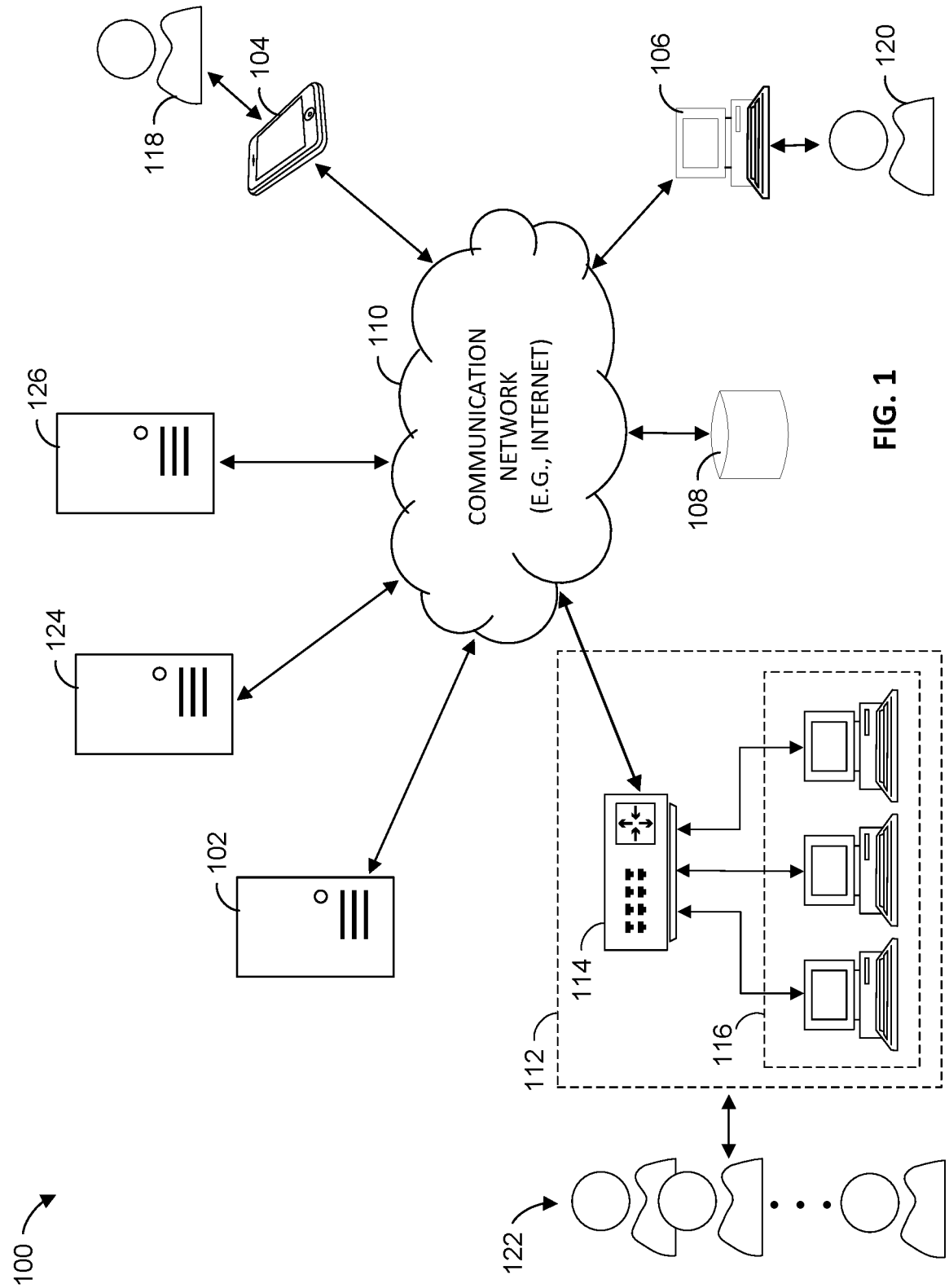
FIG. 1 is an illustration of an e-commerce marketplace that includes a smart substitution computing device in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The examples and teachings of the present disclosure relate to apparatuses and methods that are used to replace items that are ordered by a customer on an e-commerce platform with substitute items. After a customer orders one or more items on a website, mobile application or other electronic marketplace, the items that are ordered may not be available for one or more reasons as previously described. When such ordered items are unavailable, the retailer can replace the ordered item with a similar item with the goal that the customer will accept the substitute item for the ordered item. In this manner, the retailer can deliver the customer's order to the customer without losing sales or negatively impacting customer satisfaction.

Some order fulfillment process can be particularly difficult to manage with respect to the replacement or substitution of unavailable items. These order fulfillment processes can exist in the context of online grocery retailers that operate many disparate physical stores and can have multiple information technology systems, multiple store systems, virtual operators, and physical operators. Online grocery order fulfillment processes are difficult to manage especially in the context of the substitution of unavailable items because customers have differing preferences as individual preferences, and preferences can vary across geographic locations, across urban versus rural locations, among other differences. Management of item substitution process can also be difficult for online grocery retailers because individual stores can be managed differently by local personnel and individual store associates that can be used to physically pick items from the store inventory differ from location to location and even within a single store location.

The methods and apparatuses of the present disclosure include many improvements over conventional order fulfillment processes. Such improvements can include incorporating data about the preferences of individual customers into the item substitution process to minimize and/or reduce the instances in which a customer rejects a substituted item that was substituted in a customer's order. Existing or conventional order fulfillment process can suffer from many drawbacks. In existing methods for example, a substitute item can be selected by comparing words in an item description or in an item title. These methods, however, can result in substitute items being rejected by a customer because the substitute item may have similar words in its title or description but the similar words may not correspond to a characteristic of the item that the customer finds is important for acceptability.

For example, an existing method of selecting a substitute item may look for similar words in a group of possible substitute items. For example, a customer may order a package of brand X, breakfast blend decaffeinated coffee pods that includes 18 individual pods. If this item is unavailable, conventional methods may choose a substitute by searching for substitute items with similar words. The conventional method may recommend to substitute with a package of brand X, breakfast blend, regular coffee pods that includes 18 individual pods. The customer may reject this substitute because the substitution method finds many similar words in the description but fails to recognize that the customer prefers decaffeinated coffee over regular coffee. Despite the many similarities in other words and terms between the item descriptions, the caffeinated versus decaffeinated characteristic of the item is important to this customer. This type of customer preference can be considered in the methods and apparatuses of the present disclosure as will be further described below.

The methods and apparatuses of the present disclosure can also incorporate aspects that allow the order fulfillment processes to be evaluated in order to determine whether the processes may be improvements over existing or legacy processes. Existing or conventional methods of evaluating order fulfillment processes suffer from many drawbacks including the fact that the existing methods may not be able to evaluate order fulfillment processes based on a specific store, a specific region or during a specific period of time. This granularity can be especially useful in evaluating order fulfillment processes and/or substitution processes because of the complexity of the processes and the differences that may exists between locations. The methods and apparatuses of the present disclosure address these drawbacks of existing or conventional methods and can allow the evaluation of order fulfillment processes and/or substitution processes between different substitution methodologies, between individual stores or between different groups of customers at an individual store.

FIG. 1 illustrates a block diagram of an e-commerce marketplace 100 that can include a smart substitution computing device 102 (e.g., a server, such as an application server), a network order management device 124 (e.g., a server, such as an application server or web server), a global integrated fulfillment system 126 (e.g., a server or bank of servers) and a store order fulfillment system 112. Customer 118 can interact with the marketplace 100 via a mobile customer computing device 104 (e.g., a smart phone) and a customer 120 that can interact with the marketplace 100 via a desktop customer computing device 106. The e-commerce marketplace can also include a database 108. The various elements of the e-commerce marketplace 100 including the smart substitution computing device 102, the store order fulfillment system 112, the network order management device 124, the global integrated fulfillment system 126, the mobile customer computing device 104, the desktop customer computing device 106 and the database 108 can be operatively coupled over a communication network 110. The smart substitution computing device 102, the store order fulfillment system 112, the network order management device 124, the global integrated fulfillment system 126, the mobile customer computing device 104, and the desktop customer computing device 106 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 110.

In some examples, the smart substitution computing device 102, the store order fulfillment system 112, the network order management device 124, and the global integrated fulfillment system 126 can be a computer, a workstation, a laptop, a server such as a cloud-based server, or any other suitable device or combination thereof. In some examples, each of multiple customer computing devices 104, 106 can be a cellular phone, a smart phone, a tablet, a personal assistant device, a voice assistant device, a digital assistant, a laptop, a computer, or any other suitable device.

The smart substitution computing device 102 is operable to communicate with database 108 over communication network 110. For example, the smart substitution computing device 102 can store data to, and read data from, database 108. Database 108 can be a remote storage device, such as a cloud-based server, a memory device on another application server, a networked computer, or any other suitable remote storage. Although shown remote to the smart substitution computing device 102, in some examples, database 108 can be a local storage device, such as a hard drive, a non-volatile memory, or a USB stick.

Communication network 110 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 110 can provide access to, for example, the Internet.

As further shown, the store order fulfillment system 112 can include a store order management device 114 such as a server, network server or cloud-based server. One or more store workstations 116 can be operatively coupled to the store order management device 114. The store workstations 116 can be any suitable computing device such as a computer, a workstation, a laptop, a server such as a cloud-based server, cellular phone, a smart phone, a tablet, a personal assistant device, a voice assistant device, a digital assistant, a laptop, or other suitable device. One or more store associates 122 may interact with the store order fulfillment system 112 via the store workstations 116.

Figure 2:
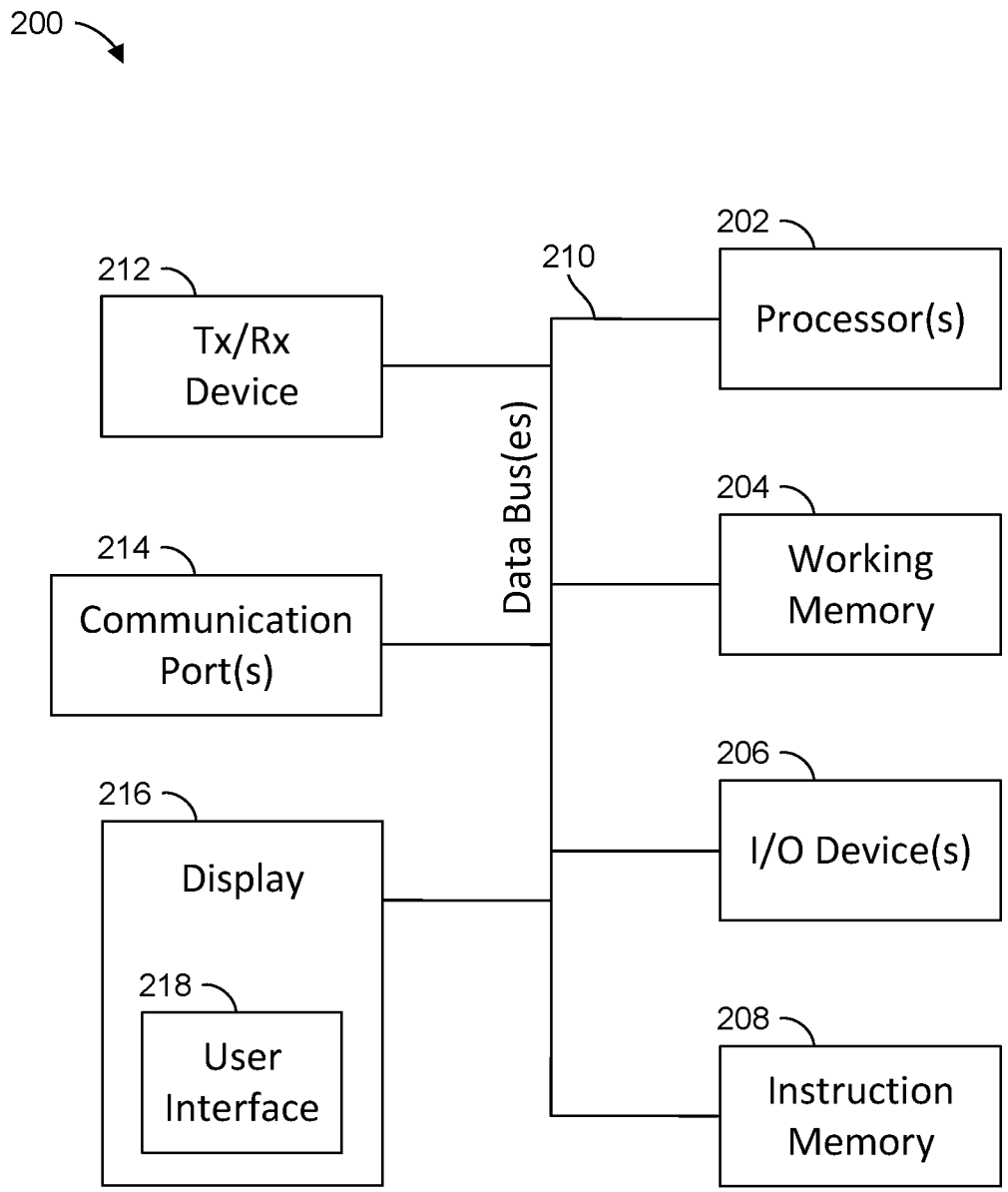
FIG. 2 is a block diagram of the smart substitution computing device of the e-commerce marketplace of FIG. 1 in accordance with some embodiments.

FIG. 2 illustrates an example computing device 200. The smart substitution computing device 102, the store order fulfillment system 112, the network order management device 124, the global integrated fulfillment system 126, and/or the user computing devices 104, 106 may include the features shown in FIG. 2. For the sake of brevity, FIG. 2 is described relative to the smart substitution computing device 102. It should be appreciated, however, that the elements described can be included, as applicable, in the store order fulfillment system 112, the network order management device 124, the global integrated fulfillment system 126, and/or the customer computing devices 104, 106.

As shown, the smart substitution computing device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the smart substitution computing device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as item data, customer data, sales data, item attribute data, customer attribute data and other types of data described herein.

Figure 7:
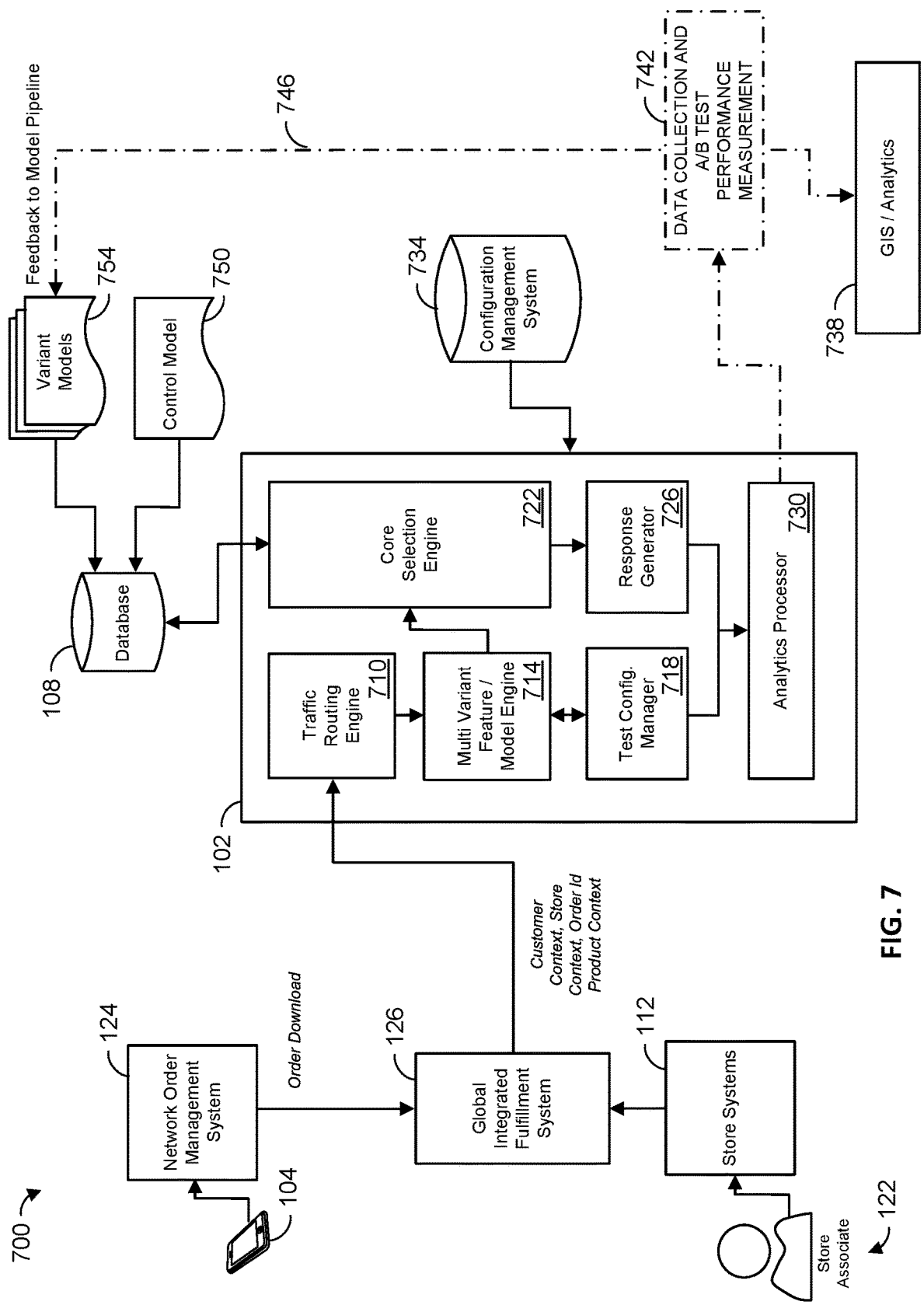
FIG. 7 is a block diagram illustrating various elements of the e-commerce marketplace of FIG. 1, including an example smart substitution computing device in accordance with some embodiments.

Display 216 can display a user interface 218. User interfaces 218 can enable user interaction with the smart substitution computing device 102. For example, user interface 218 can be a user interface that allows an operator to interact, communicate, control and/or modify different messages or features that may be presented or otherwise displayed to a user by a network-enabled tool. The user interface 218 can, for example, display the results of the evaluation of an advertising campaign using different textual, graphical or other types of graphs, tables or the like. The user interface 218 can also allow a user to define a comparison test using a test configuration manger (FIG. 7). In some examples, a user can interact with user interface 218 by engaging input-output devices 206. In some examples, display 216 can be a touchscreen, where user interface 218 is displayed on the touchscreen.

Transceiver 212 allows for communication with a network, such as the communication network 110 of FIG. 1. For example, if communication network 110 of FIG. 1 is a cellular network, transceiver 212 is configured to allow communications with the cellular network. In some examples, transceiver 212 is selected based on the type of communication network 110 smart substitution computing device 102 will be operating in. Processor(s) 202 is operable to receive data from, or send data to, a network, such as communication network 110 of FIG. 1, via transceiver 212.

Figure 3:
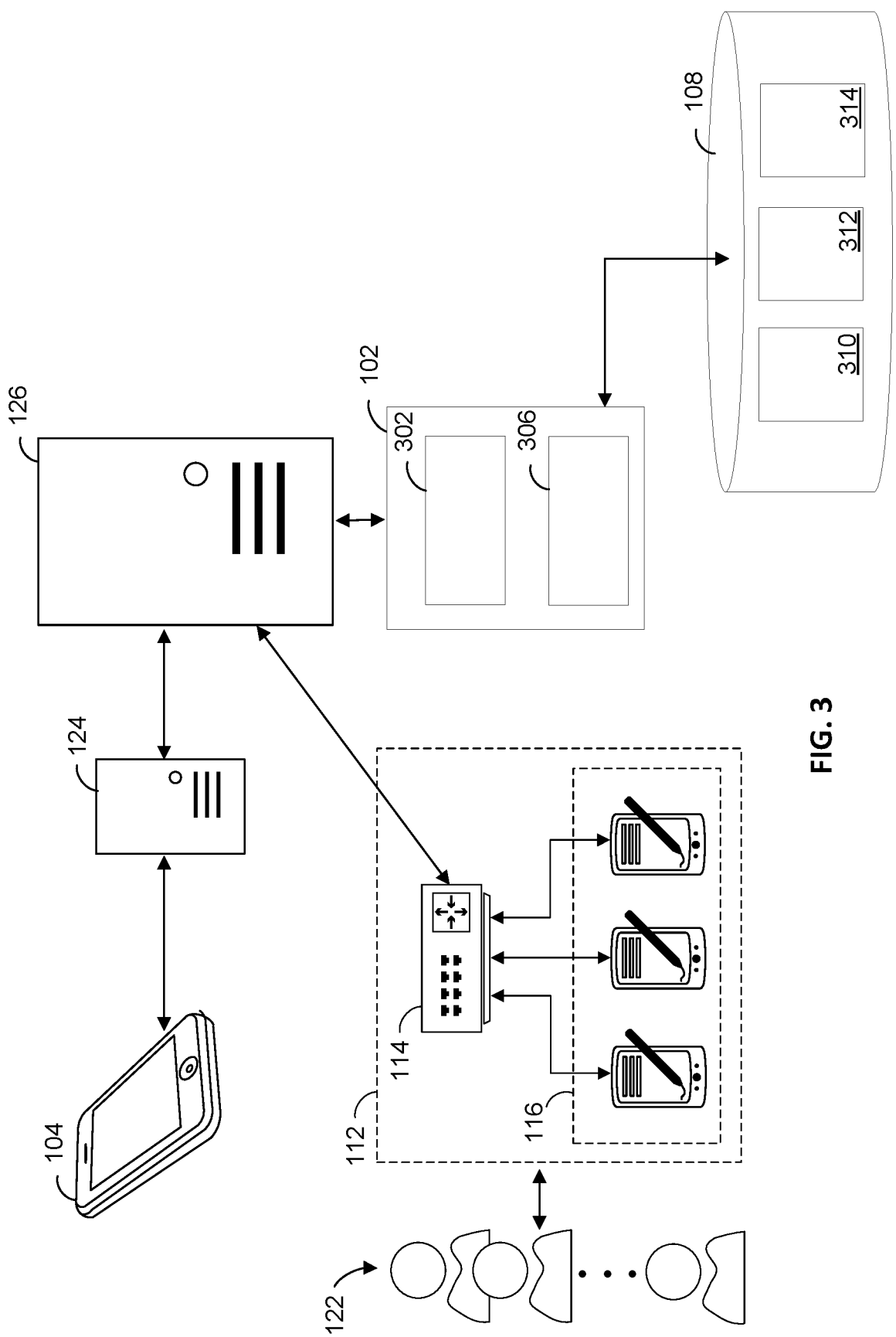
FIG. 3 is a block diagram illustrating examples of various portions of the e-commerce marketplace of FIG. 1 including the smart substitution computing device in accordance with some embodiments.

Referring now to FIG. 3, a smart substitution computing device 102 is shown. In this illustration, the network 110 is not shown. However, it should be appreciated that the communication between the mobile customer computing device 104, the store order fulfillment system 112, the network order management system 124, the global integrated fulfillment system 126, the database 108 and the smart substitution computing device 102 can be achieved by use of the network 110 as previously described.

The smart substitution computing device 102 can include a substitution identification engine 302 and a process comparison engine 306. These aspects of the smart substitution computing device 102 can be implemented using any suitable methodology. In some examples, the substitution identification engine 302 and the process comparison engine 306 can be implemented using executable instructions that can be executed by one or more processors. In some examples, substitution identification engine 302 and the process comparison engine 306 can include one or more open source tools that can be incorporated either locally or remotely.

In some embodiments, the models and/or the engines of the present disclosure include data models created using machine learning. The machine learning may involve training a model in a supervised or unsupervised setting. The data models may be trained to learn relationships between various groups of data. The data models may be based on a set of algorithms that are designed to model abstractions in data by using vector quantization, heuristic algorithms, and/or a number of processing layers. The processing layers may be made up of non-linear transformations. The data models may include, for example, neural networks, convolutional neural networks and deep neural networks. The data models may be used in large-scale relationship-recognition tasks. The models can be created by using various open-source and proprietary machine learning tools known to those of ordinary skill in the art.

As shown, the substitution identification engine 302 and the process comparison engine 306 can be coupled to each other. The substitution identification engine 302 and the process comparison engine 306 can operate to perform one or more of the example methods that will be described in further detail below.

The substitution identification engine 302 can be an aspect of the smart substitution computing device 102 that can identify, recommend and/or rank substitute items to replace an item that is ordered by a customer but is unavailable. The smart substitution computing device 102 and the substitution identification engine 302 can be implemented as part of an order fulfillment process that is performed in connection with the e-commerce marketplace 100. The e-commerce marketplace 100 can be implemented, for example, by an online grocery retailer. The process comparison engine 306 can, for example, perform one or more steps of the method 900 described further below.

The process comparison engine 306 can be an aspect of the smart substitution computing device that can evaluate the performance of the order fulfillment process and/or substitution process that is performed at least in part by the smart substitution computing device 102. The process comparison engine 306 can be integrated as part of the smart substitution computing device 102 in order to have the functionality to allow various data elements to be filtered and/or mapped to the appropriate actors, stores, and sales traffic necessary to allow reliable and actionable comparisons between the order fulfillment processes and/or substitution process that are performed in complex e-commerce marketplaces such as those marketplaces operated by online grocery retailers.

The smart substitution computing device 102 can be coupled to the database 108 to permit the smart substitution computing device 102 to read from and save to the database 108. The smart substitution computing device 102 can be coupled to the database 108 to allow the smart substitution computing device 102 to access item data 310, item attribute data 312, customer attribute data 314 and saved versions of the process comparison substitution identification engine 302. In addition, the database 108 may store and permit the smart substitution computing device 102 to access other data that may be described in the present disclosure.

Figure 4:
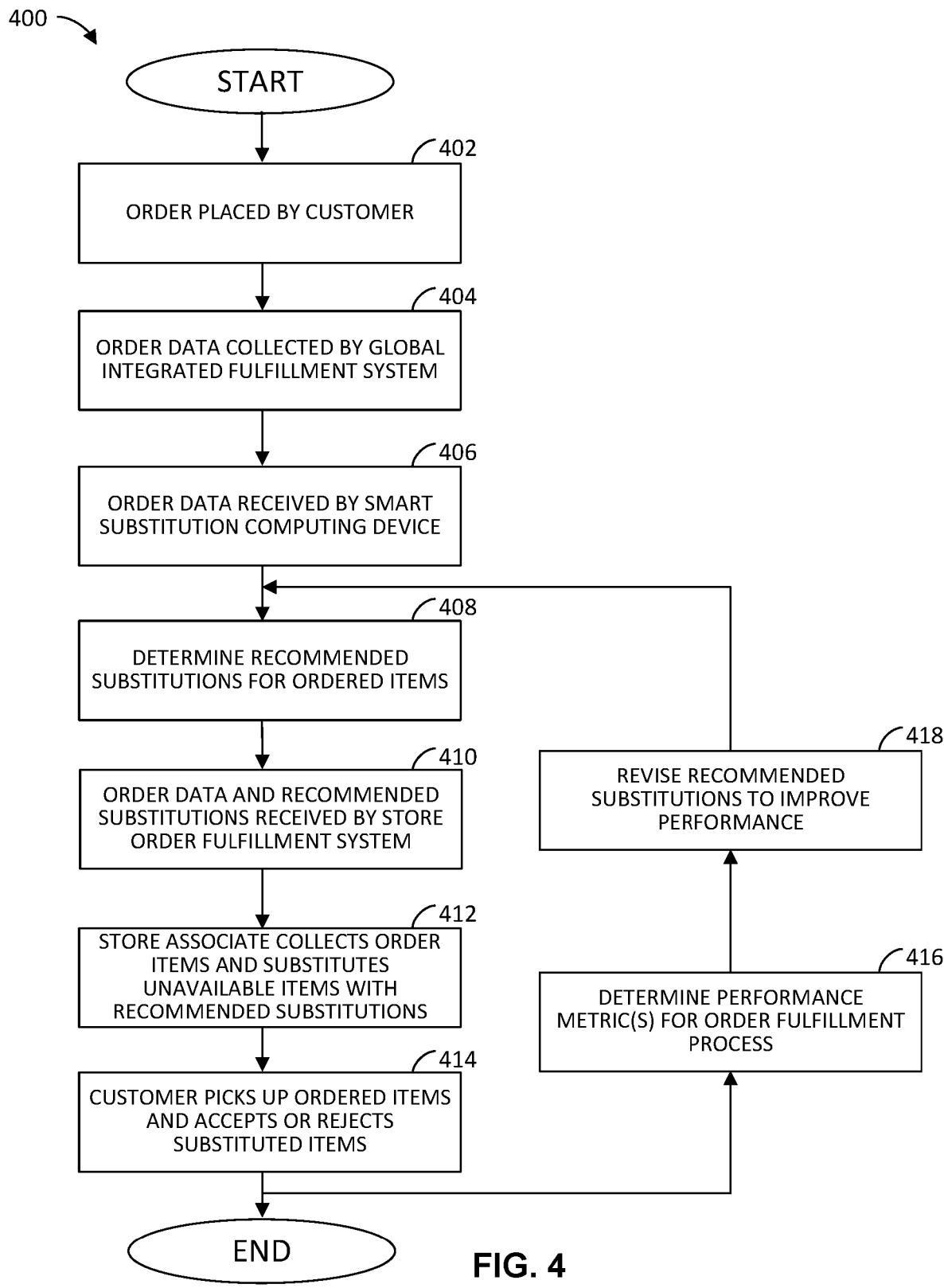
FIG. 4 is a flow chart illustrating an example order fulfillment process in accordance with some embodiments.

The smart substitution computing device 102 may perform one or more actions in an order fulfillment process and/or in a substitution process. One example order fulfillment process is illustrated in FIG. 4. The method 400 is but one example of an order fulfillment process that may be implemented by an online grocery retailer. The method 400 is described below with reference to the e-commerce marketplace 100 shown in FIGS. 1 and 3. It should be appreciated, however, that the method 400 or similar methods may be performed in other retail environments as well.

The method 400 beings with step 402 in which an order is placed by a customer. The customer 118 or customer 120 can browse items available for purchase on the mobile customer computing device 104 or the desktop customer computing device 106, respectively. The customer 118, 120 can browse items, select items and then purchase such selected items. The customer can then choose other options related to the selected items such as delivery options, pick-up options, and the like. Upon completing the order, the information about the items selected by the customer can be received by the network order management device 124.

At step 404, order data can be collected by the global integrated fulfillment system. In the example e-commerce marketplace of FIGS. 1 and 3, the network order management device 124 can send the order data to the global integrated fulfillment system 126. The global integrated fulfillment system 126 can be the centralized order processing system for the online grocery retailer. The global integrated fulfillment system 126 can operate to receive orders from customers and then send data and information to physical store locations to execute other steps of the process. The order data collected by the global integrated fulfillment system at step 404 can include an identification of the customer, purchased items, quantity of purchased items, location of store pick-up, delivery location and the like.

The method 400 continues to step 406. At step 406, order data is received by the smart substitutions computing device. The smart substitution computing device 102, for example, can receive order data that identifies the items that are part of the customer's order. The smart substitution computing device 102 can receive such order data from the global integrated fulfillment system 126. The order data can also include other information such as an order ID, customer identification information and payment information.

At step 408, the smart substitution computing device 102 can determine recommended substitutions (i.e., substitute items) for ordered items. The smart substitution computing device 102 can determine substitute items for the items ordered by the customer by using the substitution identification engine 302 and the methods of the present disclosure, as will be described in more detail below. The substitute items can be determined, for example, using item data that characterizes one or more characteristics of the ordered item in addition to using customer attribute data that can characterize a customer's purchase behavior and/or preferences on the e-commerce marketplace 100. In other examples, the substitution items can be determined using any suitable methodology.

At step 410, the order data and the recommended substitutions can be received the store order fulfillment system. For example, the global integrated fulfillment system 126 can send the order data and the recommended substitutions to the store order fulfillment system 112. The order data and the recommended substitutions can include information that lists each item that is ordered by the customer as well as one or more substitutions that are recommended by the smart substitution computing device 102. The substitutions identify items that can be substituted for the ordered items in the event that the ordered items are unavailable. The store order fulfillment system 112 can send or copy such information to the store workstations 116. In one example, the store workstations 116 can be mobile tablets, mobile phones or other mobile computing devices that a store associate 122 can carry when using the order data to physically pick out the ordered items. In other examples, the store associate 122 can print out a list of the ordered items and the recommended substitute items.

At step 412, the store associate physically collects the ordered items from a store's inventory. For example, the store associate 122 can view the "shopping list" that is received from the global integrated fulfillment system 126 and use the list to collect the ordered items from the store's inventory. If the store associate 122 attempts to collect an ordered item and the ordered item is not available in the store's inventory, the store associate 122 can replace the ordered item with a substitute item. The store associate 122 can replace the ordered item with a substitute item that is recommended by the smart substitution computing device 102. Alternatively, the store associate 122 can reject the one or more substitute items recommended by the smart substitution computing device 102 and can replace the ordered item with a replacement item of his or her choosing. As can be appreciated, various stores may have differing policies regarding the freedom of a store associate 122 in rejecting the recommended substitute items. The store policy may require a store associate 122 to replace the ordered item with a substitute item that has been recommended by the smart substitution computing device 102. After step 412, the items that were ordered by the customer (or the substitute items that have been replaced for unavailable ordered items) have all been collected by the store associate 122.

At step 414, the customer can pick up the ordered items and can either accept or reject the substitute items that may replace ordered items that are unavailable. While not shown, the store associate 122 and/or the store order fulfillment system 112 can store information that indicates whether the customer accepted or rejected the substitute items in the order. As can be appreciated, it is desirable to reduce or minimize the number of substitute items that are rejected by the customer.

Following step 414, the method 400 may move to the loop that includes step 416 and step 418 or the method 400 can end. The loop that includes step 416 and step 418 can be used to evaluate and/or improve the performance of the order fulfillment system. The steps can evaluate the performance of the smart substitution computing device 102 and/or the store associate 122 in replacing unavailable ordered items with substitute items.

At step 416, the smart substitution computing device 102 can determine one or more performance metrics for the order fulfillment process and/or the substitution process. Example performance metrics can include measures of accepted/rejected substitute items, customer satisfaction, sales revenue, repeat customers, and the like. The smart substitution computing device 102 can determine such performance measures using any suitable methodology and can use the process comparison engine 306 as will be further described below.

At step 418, one or more aspects of the order fulfillment process and/or substitution process can be revised in order to improve the performance of the process. Such aspects can be identified, for example, using the performance metrics that are determined at step 416. In some examples, one or more aspects of the substitution identification engine 302 can be modified at step 418. After step 418, the steps 408, 410, 412, and 414 can be performed using the modified order fulfillment process, including, for example, an updated version of the substitution identification engine 302. The loop that includes steps 416 and 418 can be performed multiple times and/or at periodic intervals in order to continuously improve the order fulfillment process 400 in an effort to improve the performance of the process.

The order fulfillment process 400 is a complex process that involves steps performed by multiple actors and at many disparate remote locations, especially when the process 400 is performed in the context of a large retailer such as an online grocery retailer. The method 400 includes steps performed by the customer via a customer's computing device (e.g., step 402 and step 414). The method also includes steps performed by the retailer and/or the retailer's electronic order fulfillment systems (e.g., step 404, step 406, step 408, step 410, step 416, and step 418). The method also includes steps performed by the store associate 122 at an individual store location (e.g., step 412). The complexity of the method 400 is further demonstrated by the fact that a retailer can have hundreds or thousands of physical stores that each can employ hundreds of store associates.

This complexity of the method 400 makes the determination of the performance of the order fulfillment process difficult. The differences between stores, geographic locations, human actors, unavailability of items, customer preferences and other variations can bias conventional or existing performance evaluation methodologies. The smart substitution computing device 102, therefore, has the process comparison engine and/or other elements designed to operate with the global integrated fulfillment system 126, the network order management device 124, and/or the store order fulfillment system 112 in order to collect the appropriate data and allow the data to be filtered and/or routed in such a manner as to allow various aspects of the method 400 to be effectively evaluated by the smart substitution computing device 102.

As previously described, step 408 of the process 400 allows recommended substitutions to be determined by, for example, the smart substitution computing device 102. In one example, the smart substitution computing device 102 can combine a relevance score and a preference score to rank substitute items that can replace an unavailable item ordered by a customer. The relevance score can determine a similarity between an item ordered by a customer (i.e., an ordered item or an anchor item) and a substitute item.

The smart substitution computing device 102 can use any suitable methodology to determine a similarity between the ordered item and each substitute item in a pool of possible substitute items. For example, the smart substitution computing device 102 can identify similarities in words between a title or description of an ordered item and a title or description of a substitute item. One example methodology that can be used is inverse document frequency (TF-IDF) methodology. In another example, the smart substitution computing device 102 can determine the relevance score using the substitution methodology described in U.S. patent application Ser. No. 16/424,799, entitled METHODS AND APPARATUS FOR ITEM SUBSTITUTION filed on May 29, 2019, the contents of which is incorporated by reference herein in its entirety.

Figure 5:
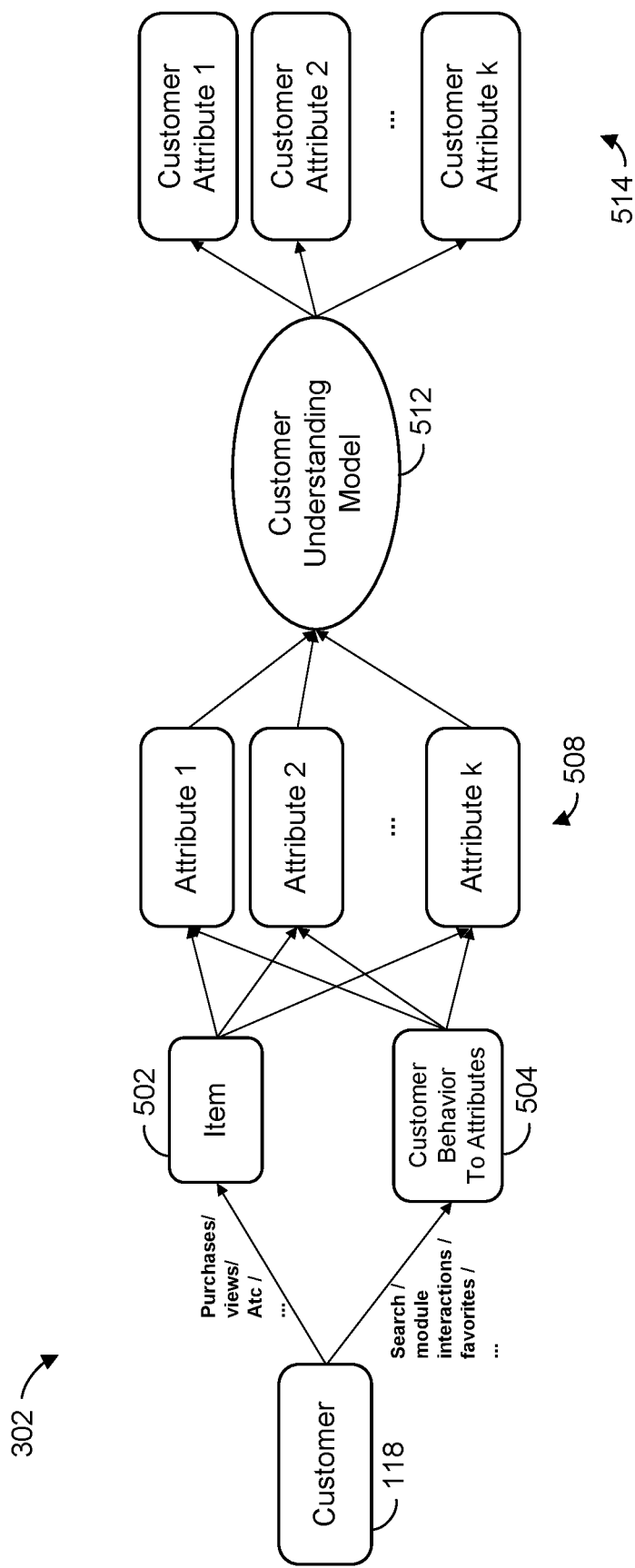
FIG. 5 is an illustration showing an example architecture of a substitution identification engine of the smart substitution computing device of FIG. 3 in accordance with some embodiments.

The smart substitution computing device 102 can also determine a preference score. The preference score for a particular substitute item can be a score that indicates the likelihood that the customer will accept the substitute item as a replacement for an ordered item. The smart substitution computing device 102 can determine the preference score using any suitable methodology. In one example, the preference score can be determined using a customer understanding model 512 (FIG. 5). The customer understanding model 512 can be trained and used to determine the customer attribute data 314. The customer attribute data 314 can then be used by the substitution identification engine 302 to determine a preference score for a particular substitute item.

An example architecture of one aspect of the substitution identification engine 302 is shown in FIG. 5. As shown, data is collected from the customer 118 in the nature of data that identifies the ordered items of an order. The database 108 and/or the global integrated fulfillment system 126 may also store information about past purchases by the customer 118 and/or other information about the customer's behavior on the retailer's website or with the e-commerce marketplace. Such information can include purchases made by the customer 118, items viewed by the customer 118, searches conducted by the customer 118, items designated as favorites by the customer, past accepted/rejected items of the customer 118, and the like. This data can be retrieved and separated or filtered by the smart substitution computing device 102 into data about the item 502 and data about the customer's behavior 504.

As further shown in FIG. 5, the smart substitution computing device 102 can take the item data 502 and map the item data 502 into one or more item attributes 508. The item attributes determine one or more characteristics of the item. The item attributes 508 are not the specific information that identifies the item but a more generalized category of information that can be used to characterize the item. Example item attributes 508 are brand, flavor, price, size, packaging, ingredient, or the like. In other examples, the item attributes 508 can include other categories of information to characterize an item that may be available on a retailer's website or e-commerce marketplace.

The smart substitution computing device 102 can then map the customer behavior data 504 to the item attributes 508. In one example, the smart substitution computing device 102 can use a customer's past purchase to determine how many times an item attribute 508 appeared in the past purchase. The customer's past purchase behavior can be used to train the customer understanding model 512. In this manner, the customer understanding model 512 can be used to determine customer attributes 514. The item attributes 508 and the related customer attributes 514 can then be used to determine the preference score.

In one example, the customer understanding model 512 can be used trained using data collected from a customer's past purchase behavior. In training the model, a target date or target month (or other target period) is set as an objective (i.e., is set as its label). The customer's purchase behavior prior to the target period can be set as the feature set. For example, if a target month is set for December 2019, the objective can be, for a given customer, to learn the number of times that the customer may have purchased a particular brand in a given month. In other examples, other attributes can be the objective (i.e., flavor, size, packaging, etc.). In the example above, the feature set can be purchases or other actions during January 2019 to November 2019 (i.e., prior to December 2019). The feature sets in the training data can be the number of times the customer with the particular brand in each of the months in the period January 2019 to November 2019.

In one example, a customer may have purchased three brand X items in March 2019, five brand X items in May 2019. The customer may also have viewed brand X items four times in May 2019. This behavior can be encoded as a feature set for the attribute brand X. This same customer may have purchases two brand X items in December 2019. The number of purchases of the brand X items in December 2019 can be set as the objective for the training data used to train the customer understanding model 512.

The training data can be assembled for various attributes as previously described and used to train the customer understanding model 512. The machine learning algorithms that may be part of the machine learning tools used to train the customer understanding model 512 can learn to predict attribute preferences (e.g., brand preferences) using the objective and set of features in the training data. During such training process, the customer understanding model 512 can learn which feature set is important (for example, purchases in November 2019 may be important, whereas views in May 2019 may not be important). The machine learning algorithms can be any suitable machine learnings tools such as a deep neural network or traditional machine learning frameworks as previously described. Once trained, the customer understanding model 512 can be used to predict the preferences of new customers using the weights or other leanings obtained during the training of the customer understanding model 512.

Figure 6:
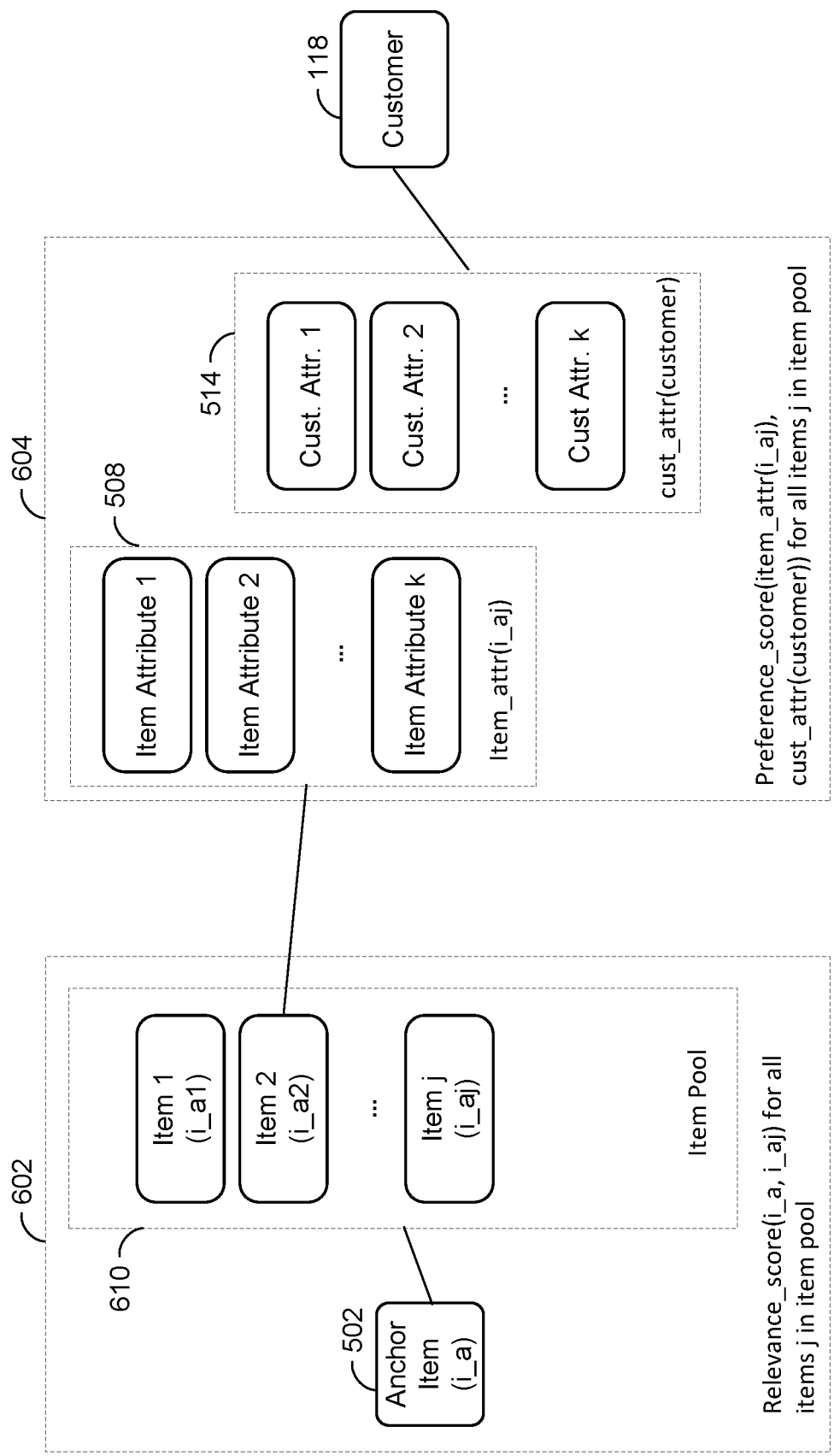
FIG. 6 is an illustration of example data elements used by the smart substitution computing device of FIG. 3 to determine an overall substitution score in accordance with some embodiments.

FIG. 6 further illustrates the architecture of the smart substitution computing device 102 that can determine the relevance score and the preference score and then combine the relevance score and the preference score to determine an overall substitution score. As shown, the smart substitution computing device 102 can determine a relevance score 602 for each anchor item 502 (or ordered item) that a customer 118 may choose to purchase. The anchor item, in the example shown, is designated as anchor_item(i_a). For each item in the item pool 610, the smart substitution computing device 102 can determine a similarity between the anchor_item(i_a) and the possible substitute items in the item pool, item_1(i_a1), item_2(i_a2) . . . item_j(i_aj). The item pool 610 can be a group of items that can be substituted for the anchor item. Any number of items j can be in the group of items in the item pool. Any suitable methodology can be used to determine a similarity between an anchor item and a substitute item as previously described. The result of this process is a relevance score, relevance_score(i_a,_i_aj), for each item j in the item pool. The relevance score can be optimized using known techniques such, for example, training a machine learning model with data that reflects whether a certain substitute item was accepted or rejected as a substitute item.

As illustrated further in FIG. 6, a preference score 604 can also be determined by the smart substitution computing device 102. The preference score 604, for example, can be determined using the substitution identification engine 302 that may include the customer understanding model 512. As previously described, for each substitute item (item_j), the smart substitution computing device 102 can determine or map the characteristics of the substitute item against the possible item attributes, item attribute 1, item attribute 2, . . . item attribute k. As can be appreciated, different item attributes can be mapped against different substitute items. Milk, for example, may be mapped against the item attributes of: type (e.g., dairy, almond, and coconut), size of container, % fat, and flavor. Coffee, for example, may be mapped against different item attributes such as: brand, flavor, type (e.g., ground, whole bean, etc.), package size, decaf vs. caffeinated, and country of origin. Item attributes can be predetermined by existing item meta information.

The smart substitution computing device 102 can then retrieve the customer attributes 514 that were determined by the customer understanding model 512. The relevant customer attributes (i.e., the customer attributes that correspond to the item attributes mapped against the substitute item) can be retrieved and used to determine the preference score, preference_score(item_attr(i_aj), cust_attr(customer)). The preference score can be calculated using any suitable methodology. In one example, the preference score can be calculated using the dot product of the item attribute and the customer attribute.

The smart substitution computing device 102 can optimize the preference score. For example, data regarding whether the customer accepts or rejects a substitute item can be used to optimize the preference score. The preference score can be optimized independently of the relevance score.

The smart substitution computing device 102 can then combine the relevance score and the preference score to obtain an overall substitution score. Any suitable methodology can be used to combine the relevance score and the preference score to obtain the overall substitution score. In one example, the relevance score and the preference score can be added together using a score parameter, $\lambda$. In the example, the overall substitution score for an anchor_item (i_a) substitute item(i_aj), and a customer(cust) can be calculated using the following formula:

$$\text{Sub\_score}(i\_a, i\_aj, \text{cust}) = \lambda * \text{rel\_score}((i\_a, i\_aj)) + (1-\lambda k) * \text{pref\_score}(\text{item\_attr}(i\_aj), \text{cust\_attr}(\text{cust}))$$

where: Sub_score=overall substitution score
rel_score=relevance score
pref_score=preference score
$\lambda$=score parameter
item_attr=item attribute
cust_attr=customer attribute The score parameter, $\lambda$ can be selected to optimize the ability of the overall substitution score in predicting whether a customer will accept or reject the substitute item as a replacement for an ordered item.

The smart substitution computing device 102 can rank the substitute items based on the overall substitution score. In some examples, the relevance score and/or the preference score are calculated using machine learning models (e.g., the customer understanding model 512 and/or the substitution identification engine 302). As such, it can be difficult to change the results of the relevance score and/or the preference score during normal operation of the smart substitution computing device. The relevance score and/or the preference score can be optimized during offline re-training or optimization of the customer understanding model 512 and/or the substitution identification engine 302. The overall substitution score, however, can be optimized and/or modified quickly by changing and/or modifying the score parameter, $\lambda$. Thus, by changing the score parameter, $\lambda$, the ranking of substitute items produced by the substitution identification engine 302 can be changed and/or optimized quickly during normal operation if so desired.

In order to determine a performance of the smart substitution computing device 102 in recommending substitute items, various performance metrics (as previously described) can be determined. The smart substitution computing device 102 can include one or more elements designed to allow reliable comparisons between two operating conditions. It may be desirable, for example, to compare two versions of the customer understanding model 512. Other comparisons may include comparing two stores, comparing before and after store associate training, comparing experience levels of store associates, comparing two geographic locations, comparing size of customer orders or the like. Such comparison can be difficult because of the complex environment in which the smart substitution computing device 102.

Turning now to FIG. 7, an example e-commerce platform 700 is shown. The e-commerce platform 700 may operate similarly to the e-commerce marketplace 100 previously described. While the network 110 is not shown in this example, the various elements of the e-commerce platform 700 can be coupled and communicate via the network 110. As shown, the smart substitution computing device 102 can be coupled to the global integrated fulfillment system 126. The customer (not shown) can interface with the e-commerce platform 700 via the mobile customer computing device 104. The customer can place an order via the mobile customer computing device 104 and cause information regarding the customer's order to be received by the network order management system 124. The network order management system 124 can convey such order data to the global integrated fulfillment system 126 that can, in turn, convey the order data to the smart substitution computing device 102.

As shown, the order data may include customer context, store context, order ID and product context. In other examples, the order data can include other information. The customer context can include customer data sufficient to identify the customer, such as name, address, registration name, email, age, gender and the like. The store context can include store data sufficient to identify the store at which the customer will visit and/or retrieve the order such as, store region, store ID, address, store management information and the like. The order ID is a unique identification number used to identify the specific order of the customer. The product context can include product data or item data sufficient to identify the items purchased by the customer and included in the customer's order. The data obtained or received by the smart substitution computing device 102 is different from many existing or conventional process comparison tools in that the smart substitution computing device 102 obtains more data or more granular data that existing process comparison tools. For example, the smart substitution computing device obtains the unique order ID, customer context and store context rather than using cookies to identify an order. With this additional information, the smart substitution computing device 102 is able to filter and sample data (as will be further described) in order to reliably and effectively compare two operating conditions of the e-commerce platform 700.

The smart substitution computing device 102 can include the test configuration manager 718. The test configuration manager 718 can be an aspect of the smart substitution computing device 102 that allows a user to set-up, run and compare two operating conditions of the e-commerce platform 700. The test configuration manager 718 can be coupled to a suitable input-output device such as a graphical user interface that allows a user to define a comparison test. The user can select, for example, the size of the test and/or other parameters to describe the desired comparison test.

For example, a new or updated customer understanding model 512 may have been trained using the methodologies previously described. In order to compare the existing model against the updated customer understanding model 512, a user can use the test configuration manager 718 to define a test in which the existing customer model is tested against the updated customer understanding model. The user may choose to limit the comparison to single store in order that other factors do not bias or confound the results of the test. Such test parameters, among others, are available to the user via the test configuration manager 718.

Once the user defines a desired test, the traffic routing engine 710 can filter and/or route the data accordingly in order to obtain data as was defined by the user. In the example previously described, the traffic routing engine 710 can route orders that are placed to the defined store location to both the existing customer understanding model and to the updated customer understanding model. The traffic routing engine 710 can randomly select such orders to both versions of the model. The traffic routing engine 710 can route orders to a test group and a control group, for example.

The multi-variant feature/model engine 714 is an aspect of the smart substitution computing device 102 that can allow other aspects of the order fulfillment process to modified during a comparison. The multi-variant feature/model engine 714 can, for example, change different parameters of the order fulfillment process if such a comparison is desired by the user and is defined by the user during test configuration. For example, a user may desire to change the number of substitutes that are presented to a store associate 122 by the smart substitution computing device 102. The multi-variant feature/model engine 714 can also provide the ability to execute combinations of features and/or models concurrently. In other examples, other features can be varied using the multi-variant feature/model engine 714.

The core selection engine 722 and the response generator 726 can be aspects of the smart substitution computing device 102 that perform operations similar or the same as that previously described in the selection of a substitute item. The core selection engine 722 can be coupled to the database 108 in which one or more versions of the customer understanding model 512 and/or the substitution identification engine 302 can be stored. As shown, the database 108 may contain a control model 750 and variant models 754. In the example previously described, the existing customer understanding model can be the control model 750 and the updated customer understanding model can be one of the variant models 754. The core selection engine 722 can retrieve the control model and one or more of the variant models 754 from the database 108 as defined by a user during the test configuration.

The core selection engine 722 can operate, as previously described, to determine recommend substitute items and provide such recommended substitute items via the response generator 726. The substitute items can be sent by the smart substitution computing device 102 to the global integrated fulfillment system 126 that, in turn, can send the substituted items and other order data to the store system 112. The store associate can then retrieve the ordered items and replace unavailable ordered items with the substitute items recommended by the smart substitution computing device 102. When the customer picks up the order, the customer can either accept the substitute items or reject the substitute items. Such information can be collected by the store system 112 and sent to the global integrated fulfillment system 126 that can, in turn, send the acceptance/rejection information (as well as other order fulfillment data) to the smart substitution computing device 102.

When the test (as configured by the user) is complete, the relevant data can be sent to the analytics processor 730. The analytics processor 730 can determine various performance metrics and/or aggregate the data from the test. The analytics processor 730 can send the test performance data to the data collection and A/B test performance measurement 742. This data can be used via the feedback loop 746 to improve and/or modify the variant models 754. The performance data can also be sent to global information systems (GIS) and analytics for further storage and/or processing.

While the foregoing description describes the performance of the smart substitution computing device 102 in comparing two operating conditions of the e-commerce platform 700. The two operating conditions can also be considered as a first order fulfillment process and a second order fulfillment process. As such, whether the terms first operating condition and second operating condition or first order fulfillment process and second order fulfillment process are used in the context of this disclosure, it should be appreciated that the smart substitution computing device 102 can be used to compare two processes in which one or more aspects (e.g., time, performance of steps, actors, location, customer, size of order, period of time, start date, end date, etc.) of the processes are different.

Figure 8:
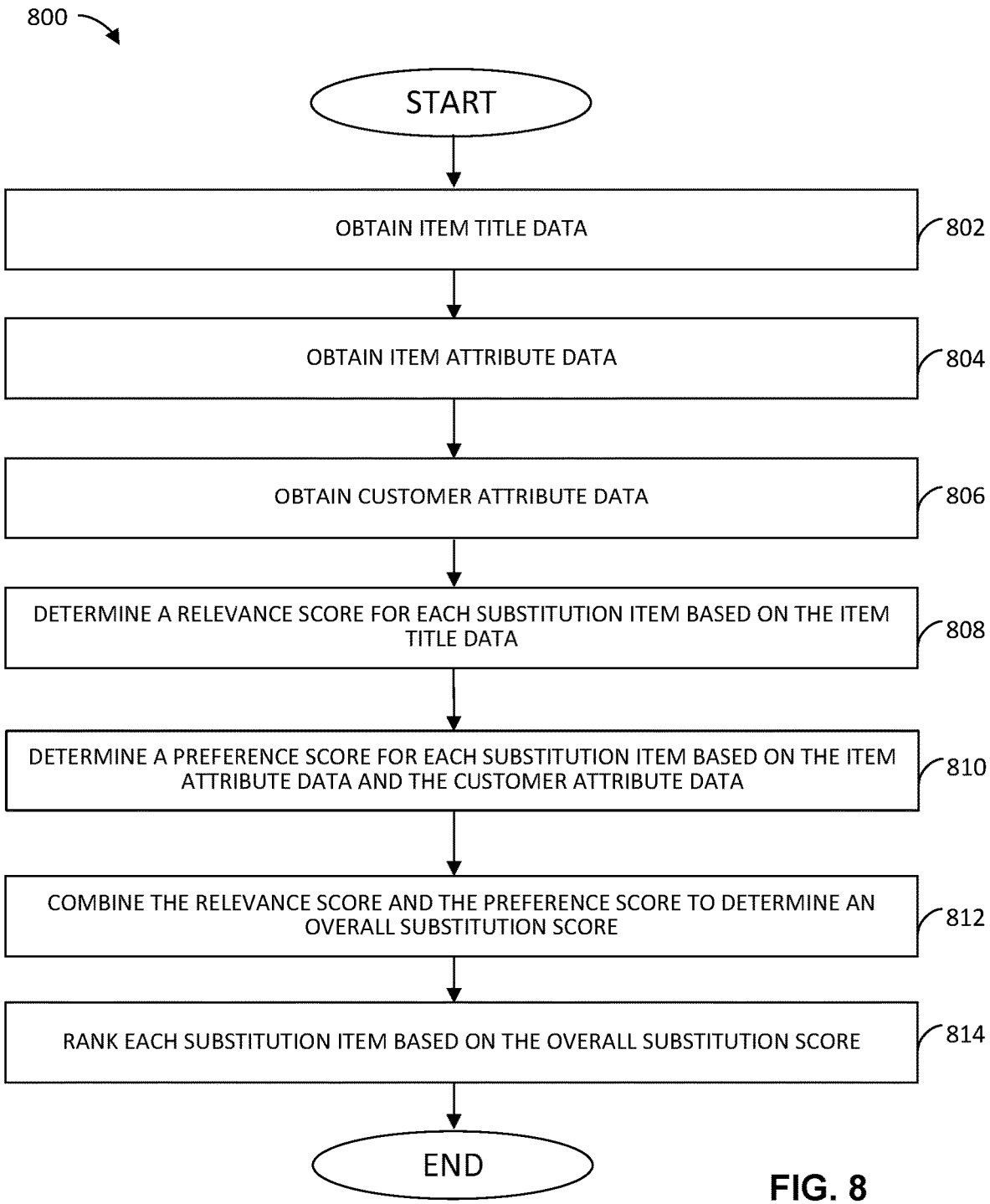
FIG. 8 is a flow chart illustrating an exemplary method of ranking substitution items in accordance with some embodiments.
Figure 9:
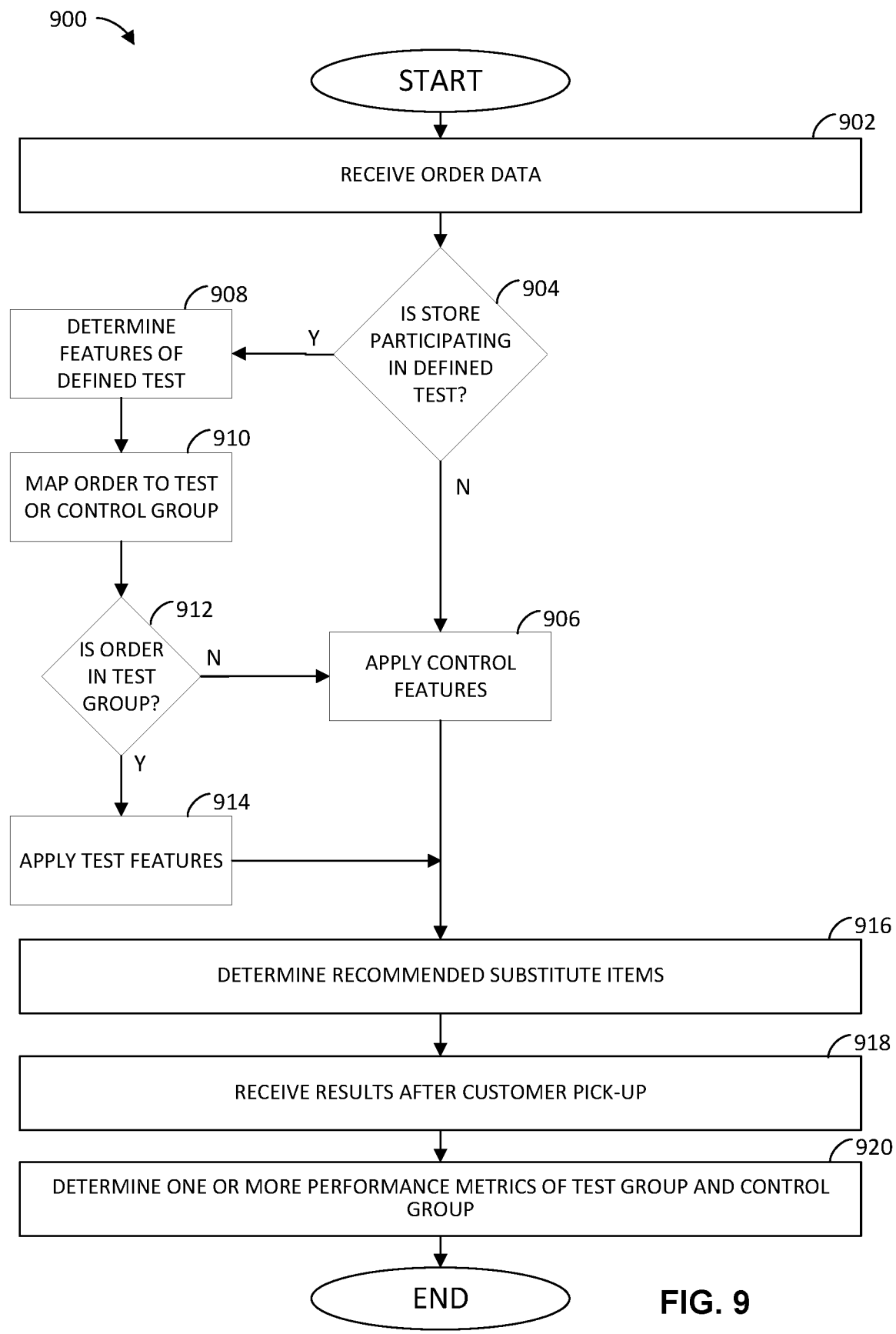
FIG. 9 is a flow chart illustrating an exemplary method of comparing order fulfillment processes in accordance with some embodiments.

The smart substitution computing device 102 can operate to perform various methods of determining recommended substitute items and to evaluate the performance of order fulfillment processes. FIGS. 8 and 9 illustrate an example method of determining recommended substitute items and evaluating the performance of two order fulfillment processes, respectively.

As shown in FIG. 8, the method 800 begins at step 802. At step 802, the smart substitution computing device 102 can obtain item title data. Item title data can be any data describing characteristics of items. The item title data can include information regarding an anchor item (or ordered item) and/or substitute items in the item pool. The smart substitution computing device 102 can receive the item title data from the database 108 or can receive the item title data from the global integrated fulfillment system 126. In other examples, the smart substitution computing device 102 can receive item title data from other data sources or other devices coupled to the smart substitution computing device 102.

At step 804, the smart substitution computing device 102 can obtain item attribute data. The item attribute data can be the item attributes 508 previously described. The item attribute data can identify general characteristics of the substitution items. The item attribute data can be obtained from the database 108 or from other data storage devices. The item attribute data can be determined by the smart substitution computing device 102 on a periodic basis and stored in the database 108, for example.

At step 806, the smart substitution computing device 102 can obtain customer attribute data. The customer attribute data can be the customer attributes 514 previously described. The customer attribute data, for example, can be determined by the customer understanding model 512 and stored in the database 108. In other examples, the customer attribute data can be stored in other local and remote locations.

At step 808, the smart substitution computing device 102 can determine a relevance score 602 for each substitution item based on the item title data. Any suitable method, including the methods previously described, can be used to determine the relevance score. The relevance score 602, for example, can determine the similarity of an ordered item (or anchor item) to a substitute item by comparing the similarity of terms used to describe the ordered item and the substitute item.

At step 810, the smart substitution computing device 102 can determine a preference score 604 for each substitution item based on the item attribute data and the customer attribute data. Any suitable method, including the methods previously described, can be used by the smart substitution computing device 102 to determine the preference score 604. In one example, the preference score 604 can be the dot product of the item attribute data and the customer attribute data for a substitute item.

At step 812, the smart substitution computing device 102 can combine the relevance score and the preference score to determine an overall substitution score. The smart substitution computing device 102 can use any suitable method to combine the relevance score and the preference score. For example, the smart substitution computing device can weigh the relevance score and the preference score with a score parameter. The smart substitution computing device can also use the methods and formulas previously described to combine the relevance score and the preference score to determine the overall substitution score.

At step 814, the smart substitution computing device can rank each substitution item based on the overall substitution score. The smart substitution computing device 102 can rank the substitution item based on the likelihood that that the customer will accept the substitute item as a replacement for an ordered item. While not shown in the FIG. 8, the smart substitution computing device 102 can also send one or more recommended substitute items to the global integrated fulfillment system 126 and/or to the store order fulfillment system 112. In one example, the smart substitution computing device 102 can select two recommended substitute items from the ranked substitute items. In another example, the smart substitution computing device 102 can select three recommended substitute items from the ranked substitute items. In other examples, the smart substitution computing device 102 can select up to ten recommended substitute items from the ranked substitute items.

As can be seen, the smart substitution computing device 102 can operate to determine two measures of the likelihood that a customer will accept a substitute item as a replacement for an ordered item. In the example shown, the method determines a relevance score and a preference score. The relevance score determines a similarity of the ordered item to the substitute item. The preference score determines preferences of the customer relative to the attributes of the ordered item and the substitute item. These two measures can be independently optimized and combined to determine the overall substitution score.

FIG. 9 illustrates an example method 900 of comparing two operating conditions of an order fulfillment process. While any suitable computing device can be used to perform one or more steps of the method 900, the method is described with reference to the e-commerce platform 700 and the smart substitution computing device 102 shown in FIG. 7. At step 902, the smart substitution computing device 102 can receive order data. The order data can be data indicating an order placed by a customer on an e-commerce platform. For example, the customer 118 can be interfacing with the e-commerce platform 700 via the mobile customer computing device 104 and submit an order for items to picked up by the customer at a physical retail store. The order data can be transmitted to and received by the smart substitution computing device 102 via the network order management system 124 and the global integrated fulfillment system 126.

The order data can include various elements and/or information. The order data can include, for example, an order identification number, store data that characterizes a store location at which the customer desires to pick up the order and item data that characterizes the ordered items. The order identification number (order ID) can include digits or other indicators that can indicate to the smart substitution computing device 102 various pieces of information. For example, the order ID can indicate a customer, a geographic location, and a store identification. In other examples, the order data and the order ID can include other information that the smart substitution computing device 102 can use to perform the steps of method 900 described below.

At step 904, the smart substitution computing device 102 can determine if the store that will fulfill the order (and the store at which the customer 118 will pick up the order) is participating in a defined test. As previously described, a user of the smart substitution computing device 102 that desires to conduct a comparison test can define a comparison test using the test configuration manager 718. The user may define that the test is to be conducted at one or more store locations. The traffic routing engine 710 of the smart substitution computing device 102 can receive such test configuration data and determine if an order that is received is part of the defined test. The traffic routing engine 710, for example, can determine if the order and/or store is part of the defined test by comparing the order ID to the user-defined test parameters. The use of the order ID or other aspects of the order data rather than by cookies is an improvement over existing methods. The use of cookies by conventional methods in mapping or routing orders for comparison purposes limits the ability of conventional methods to provide the granular, reliable comparison tests performed by the apparatuses and methods of the present disclosure. If the order data indicates that the order and/or the store is not participating in the defined test, then the method moves to step 906. If the traffic routing engine 710 determines that the order and/or the designated store is part of the defined test, the method moves to step 908.

At step 908, the smart substitution computing device 102 determines the features of the defined test. As previously described, the test defined by the user may define one or more features that are to be included as part of the test. Such definition of the test can be input by the user and stored as test configuration data. The test configuration data indicates one or more test conditions characterizing the user-defined comparison test. For example, the features of the test may define that a certain version of the customer understanding model 512 is to be tested against another version of the customer understanding model 512. In other examples, the features can define types of customers, geographic locations, stores, order fulfillment processes, types of store associates, training of store associates, periods of time, lengths of tests, and the like. In still other examples, other features can be defined. At step 908, the multi-variant feature/model engine 714 can determine the features of the defined test. While not shown, the smart substitution computing device 102 and/or the multi-variant feature/model engine 714 can determine whether the order satisfies one or more conditions defined in the test configuration data. For example, the order data can be compared to the test configuration data to determine if the order should be included as part of the test. If a particular type of store associate is designated in the test (e.g., store associate with at least three months experience), the smart substitution computing device 102 can determine whether to include the order as part of the test after the smart substitution computing device 102 determines the features of the defined test at step 908.

At step 910, the smart substitution computing device 102 can map the order to either a test group or a control group. The traffic routing engine 710, for example, can randomly route the orders to either the test group or the control group in order to define groups of orders for comparison. At step 912, the smart substitution computing device 102 can determine whether the order has been mapped or routed to the test group or to the control group. If the order is routed to the test group the method proceeds to step 914. If the order is routed to the control group, the method proceeds to step 906.

At step 906, the smart substitution computing device can apply the control features to the orders designated to the control group. The control features can be the features previously described. In one example, the control features can define a version of the customer understanding model 512. In other examples, other features can be defined in the control features.

At step 914, the smart substitution computing device 102 can apply the test features to the orders designated to the test group. The test features can be any of the features previously described. In one example, the test features can define a version of the customer understanding model 512. As can be appreciated, the test features can define a different version of the customer understanding model 512 than the control features. The test features can define at least one feature that is different from the control features. In this manner, a user can compare the effect of the at least one different feature by comparing the performance of the test group against the control group using one or more performance metrics.

The method 900 proceeds to step 916. At step 916, the smart substitution computing device 102 can determine recommended substitute items. The smart substitution computing device 102 can determine the recommended substitute items using any suitable method, including the methods previously described such as method 800. When the smart substitution computing device 102 determines the recommended substitute items at step 916, the substitute items in the test group may be different from the substitute items in the control group because the test features have been applied to the orders in the test group and the control features have been applied to the orders in the control. In other examples, other aspects of the order fulfillment processes may be different between the test group and the control group (e.g., store, location, store associate, store training, store management, etc.).

At step 918, the smart substitution computing device 102 receives the results after the customer has picked up the order. While not shown in the method 900 and prior to step 918, the smart substitution computing device 102 can send the recommended substitution items to the store order fulfillment system 112. After receipt, a store associate 122 can fill the order by choosing the ordered items in the order and replacing ordered items with the substitute items in instances in which the ordered items are unavailable. After the order is filled by the store associate 122, the customer 118 can pick up the order and decide whether to accept or reject a substitute item in the order. The store order fulfillment system 112 can record the acceptance data that indicates whether the customer 118 accepted or rejected a substitute item. The store order fulfillment system 112 can send the acceptance data to the smart substitution computing device 102 via the global integrated fulfillment system 126.

At step 920, the smart substitution computing device 102 can determine one or more performance metrics of the test group and the control group. In one example, the analytics processor 730 of the smart substitution computing device 102 can determine the one or more performance metrics. Example performance metrics include quantities of accepted/rejected substitute items, customer satisfaction, sales revenue, repeat customers, and the like. In other examples, other performance metrics can be determined at step 920.

The previously described method 900 describes a method of comparing one or more aspects of an order fulfillment process in the context of the smart substitution computing device 102. As can be appreciated, one or more elements or one or more steps of the method 900 can also be applied to other order fulfillment processes. For example, the traffic routing engine 710, the multi-variant feature/model engine 714, the test configuration manager 718 and/or the analytics processor 730 can be included as part of other e-commerce platforms and/or other order fulfillment apparatuses.

Although the methods described above are with reference to the illustrated flowcharts, it will be appreciated that many other ways of performing the acts associated with the methods can be used. For example, the order of some operations may be changed, and some of the operations described may be optional.

In addition, the methods and systems described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising at least one computing device coupled to one or more data sources comprising at least one server, the at least one computing device configured to:
   obtain test configuration information via a user interface of a test configuration manager;
   retrieve a first version of a trained machine learning customer understanding model and a second version of the trained machine learning customer understanding model from the one or more data sources;
   receive order data characterizing orders placed by one or more customers on an e-commerce platform;
   filter orders defined by the test configuration information to obtain filtered orders by comparing the received order data to the test configuration information;
   assign orders from the filtered orders to a first group or a second group;
   determine recommended first test substitute items based on overall test substitution scores of possible substitute items using the first version of the trained machine learning customer understanding model;
   determine recommended second test substitute items based on overall control substitution scores of possible substitute items using the second version of the trained machine learning customer understanding model;
   send the recommended first test substitute items for the first group of orders and the recommended second test substitute items for the second group of orders to a store order fulfillment system;
   determine one or more performance metrics of each of the first version of the trained machine learning customer understanding model and the second version of the trained machine learning customer understanding model; and
   compare one or more performance metrics of the first version of the trained machine learning customer understanding model to the second version of the trained machine learning customer understanding model.

2. The system of claim 1, wherein the test configuration information defines the first version of a trained machine learning customer understanding model and the second version of the trained machine learning customer understanding model.

3. The system of claim 1, wherein the test configuration information defines a store location.

4. The system of claim 1, wherein the order data comprises an order identification number, store data characterizing a store location at which the customer desires to pick-up the order and item data characterizing ordered items.

5. The system of claim 1, wherein the overall test substitution score is calculated by the at least one computing device by combining a relevance score and a preference score for each possible substitute item.

6. The system of claim 5, wherein the relevance score indicates a similarity between a possible substitute item and an anchor item and the preference score indicates a preference for one or more attributes of a possible substitute item.

7. The system of claim 1, wherein the computing device is further configured to receive acceptance data that indicates whether the recommended first test substitute items or the recommended second test substitute items were accepted or rejected.

8. A computer-implemented method, comprising:
   receiving test configuration information via a user interface of a test configuration manager;
   retrieving, from one or more data sources, a first version of a trained machine learning customer understanding model and a second version of the trained machine learning customer understanding model;
   obtaining order data characterizing orders placed by customers on an e-commerce platform;
   comparing the order data to the test configuration information to filter orders defined by the test configuration information to obtain filtered orders;
   assigning orders from the filtered orders to a first group or a second group;
   determining recommended first test substitute items based on overall test substitution scores of possible substitute items using the first version of the trained machine learning customer understanding model;
   determining recommended second test substitute items based on overall control substitution scores of possible substitute items using the second version of the trained machine learning customer understanding model;
   sending the recommended first test substitute items for the first group of orders and the recommended second test substitute items for the second group of orders to a store order fulfillment system;
   determining one or more performance metrics of each of the first version of the trained machine learning customer understanding model and the second version of the trained machine learning customer understanding model; and comparing one or more performance metrics of the first version of the trained machine learning customer understanding model to the second version of the trained machine learning customer understanding model.

9. The method of claim 8, wherein the test configuration information defines the first version of a trained machine learning customer understanding model and the second version of the trained machine learning customer understanding model.

10. The method of claim 8, wherein the test configuration information defines a store location.

11. The method of claim 8, wherein the order data comprises an order identification number, store data characterizing a store location at which the customer desires to pick-up the order and item data characterizing ordered items.

12. The method of claim 8, wherein the overall test substitution score is calculated by the at least one computing device by combining a relevance score and a preference score for each possible substitute item.

13. The method of claim 12, wherein the relevance score indicates a similarity between a possible substitute item and an anchor item and the preference score indicates a preference for one or more attributes of a possible substitute item.

14. The method of claim 8, comprising receiving acceptance data that indicates whether the recommended first test substitute items or the recommended second test substitute items were accepted or rejected.

15. A non-transitory computer readable medium having instructions stored thereon, wherein the instructions, when executed by at least one processor, cause a device to perform operations comprising:

obtaining test configuration information via a user interface of a test configuration manager;

retrieving a first version of a trained machine learning customer understanding model and a second version of the trained machine learning customer understanding model from the one or more data sources;

obtaining order data characterizing orders placed by customers on an e-commerce platform;

comparing the order data to the test configuration information to filter orders defined by the test configuration information to obtain filtered orders; assigning orders from the filtered orders to a first group or a second group;

determining recommended first test substitute items based on overall test substitution scores of possible substitute items using the first version of the trained machine learning customer understanding model;

determining recommended second test substitute items based on overall control substitution scores of possible substitute items using the second version of the trained machine learning customer understanding model;

sending the recommended first test substitute items for the first group of orders and the recommended second test substitute items for the second group of orders to a store order fulfillment system;

determining one or more performance metrics of each of the first version of the trained machine learning customer understanding model and the second version of the trained machine learning customer understanding model; and comparing one or more performance metrics of the first version of the trained machine learning customer understanding model to the second version of the trained machine learning customer understanding model.

16. The non-transitory computer readable medium of claim 15, wherein the test configuration information defines the first version of a trained machine learning customer understanding model and the second version of the trained machine learning customer understanding model.

17. The non-transitory computer readable medium of claim 15, wherein the test configuration information defines a store location.

18. The non-transitory computer readable medium of claim 15, wherein the order data comprises an order identification number, store data characterizing a store location at which the customer desires to pick-up the order and item data characterizing ordered items.

19. The non-transitory computer readable medium of claim 15, wherein the overall test substitution score is calculated by the at least one computing device by combining a relevance score and a preference score for each possible substitute item.

20. The non-transitory computer readable medium of claim 19, wherein the relevance score indicates a similarity between a possible substitute item and an anchor item and the preference score indicates a preference for one or more attributes of a possible substitute item.

* * * * *